US012253374B1

(12) United States Patent
Gu (10) Patent No.: US 12,253,374 B1
(45) Date of Patent: Mar. 18, 2025

(54) SYSTEMS AND METHODS FOR PROTECTING USERS

(71) Applicant: GEN DIGITAL INC., Tempe, AZ (US)

(72) Inventor: Lei Gu, Bedford, MA (US)

(73) Assignee: Gen Digital, Inc., Tempe, AZ (US)

( * ) Notice: Subject to any disclaimer, the term of this patent is extended or adjusted under 35 U.S.C. 154(b) by 364 days.

(21) Appl. No.: 17/932,464

(22) Filed: Sep. 15, 2022

(51) Int. Cl.
*H04L 1/00* (2006.01)
*G01C 21/34* (2006.01)

(52) U.S. Cl.
CPC ..... *G01C 21/3461* (2013.01); *G01C 21/3415* (2013.01); *G01C 21/3492* (2013.01)

(58) Field of Classification Search
CPC ... G01C 21/3617; G01C 21/387; H04W 4/48; G06Q 50/01; G06F 16/2365; C25B 9/65; G06T 7/90; B60W 2420/42; G08G 1/202
See application file for complete search history.

(56) References Cited

U.S. PATENT DOCUMENTS 11,371,857 B2 * 6/2022 Canavor ............... H04W 4/48
2020/0377128 A1 * 12/2020 Marczuk ........... G08G 1/096816

* cited by examiner

Primary Examiner — Phuoc H Doan
(74) Attorney, Agent, or Firm — Greenberg Traurig, LLP (57) ABSTRACT

The disclosed computer-implemented method for protecting users may (i) include collecting a set of field reports indicating respective geofencing violations, (ii) grading a safety measurement, based on an analysis of the respective geofencing violations, for each candidate route in a set of multiple candidate routes generated for travel between a starting point and a destination point, and (iii) recommending, from among the set of multiple candidate routes, a recommended route based at least in part on the recommended route being graded as safer than another candidate route. Various other methods, systems, and computer-readable media are also disclosed.

20 Claims, 8 Drawing Sheets

SYSTEMS AND METHODS FOR PROTECTING USERS

BACKGROUND

Modern GPS systems may route users between two locations based on factors such as travel time and distance. Nevertheless, these GPS systems may sometimes expose users to risks or dangers that might otherwise be ameliorated, as discussed further below.

SUMMARY

As will be described in greater detail below, the present disclosure describes various systems and methods for protecting users. In one example, a method for protecting users may include (i) collecting a set of field reports indicating respective geofencing violations, (ii) grading a safety measurement, based on an analysis of the respective geofencing violations, for each candidate route in a set of multiple candidate routes generated for travel between a starting point and a destination point, and (iii) recommending, from among the set of multiple candidate routes, a recommended route based at least in part on the recommended route being graded as safer than another candidate route.

In some examples, each field report in the set of field reports indicates at least two of (i) date and time, (ii) a weather condition, or (iii) whether a user was walking or driving.

In some examples, each field report in the set of field reports indicates at least one of whether a user was a driver or a passenger or whether the user was alone or not alone.

In some examples, the method further includes filtering a subset of field reports from the set of field reports based on a determination that the subset of field reports does not sufficiently match a current condition for traveling from the starting point to the destination point.

In some examples, the method further includes at least partially anonymizing data in the field reports to protect user privacy.

In some examples, the field reports are locked within a vault of a backend security server for a cybersecurity vendor.

In some examples, the field reports achieve crowdsourcing such that a user of a cybersecurity application benefits from other users issuing the field reports of geofencing violations.

In some examples, grading the safety measurement for each candidate route is performed in response to a request for an application to recommend a safe route.

In some examples, each candidate route is generated in response to the request for the application to recommend the safe route.

In some examples, geofencing prevents a user from being exposed to an entity that is dangerous to the user due to a vulnerability that is specific to the user.

In one embodiment, a system for protecting users may include at least one physical processor and physical memory that includes computer-executable instructions that, when executed by the physical processor, cause the physical processor to perform a method including (i) collecting a set of field reports indicating respective geofencing violations, (ii) grading a safety measurement, based on an analysis of the respective geofencing violations, for each candidate route in a set of multiple candidate routes generated for travel between a starting point and a destination point, and (iii) recommending, from among the set of multiple candidate routes, a recommended route based at least in part on the recommended route being graded as safer than another candidate route.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to perform a method including (i) collecting a set of field reports indicating respective geofencing violations, (ii) grading a safety measurement, based on an analysis of the respective geofencing violations, for each candidate route in a set of multiple candidate routes generated for travel between a starting point and a destination point, and (iii) recommending, from among the set of multiple candidate routes, a recommended route based at least in part on the recommended route being graded as safer than another candidate route.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting users. The following will provide, with reference to FIGS. 1-2, detailed descriptions of example systems for protecting users. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

Figure 1:
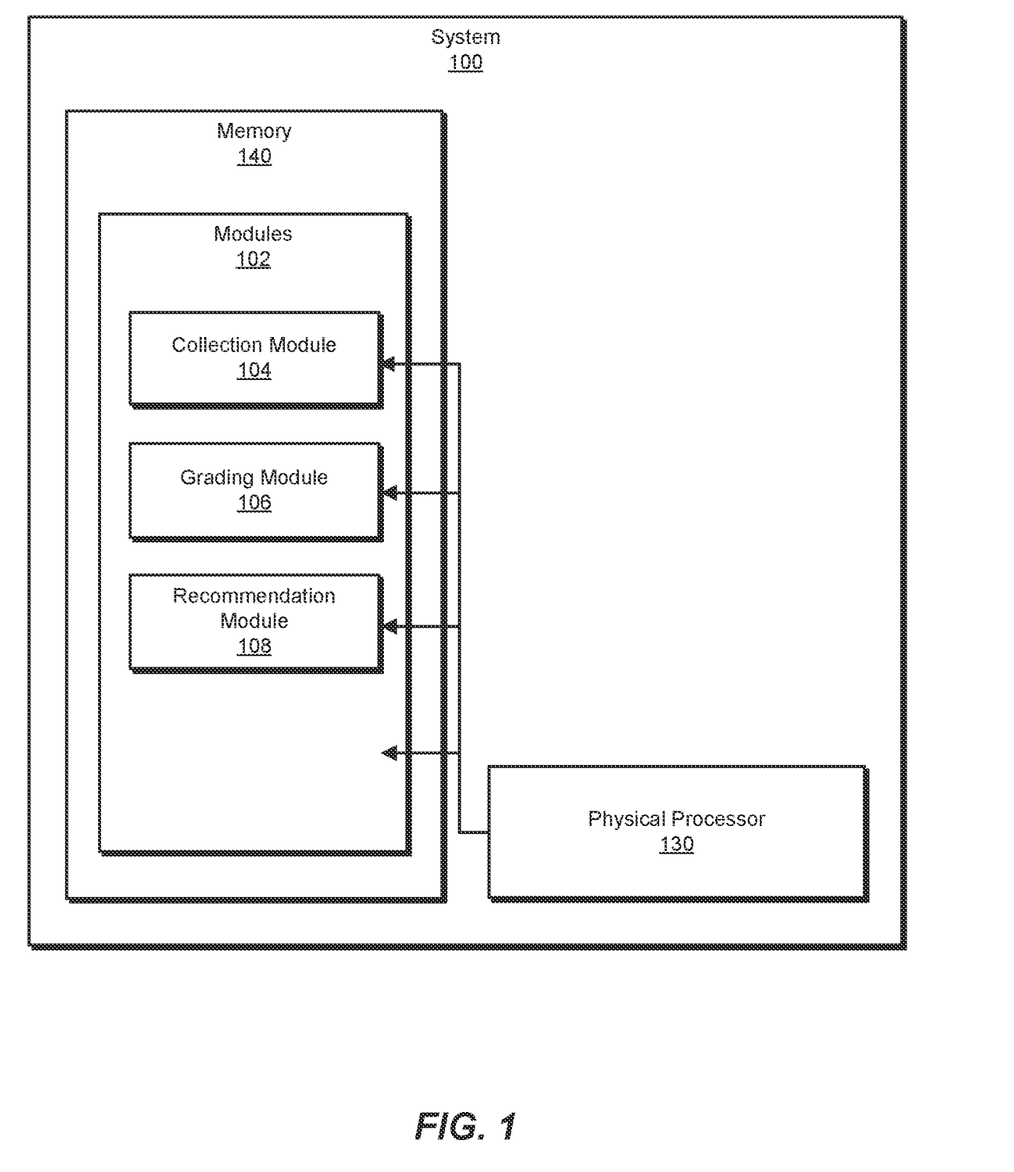
FIG. 1 is a block diagram of an example system for protecting users.

FIG. 1 is a block diagram of an example system 100 for protecting users. As illustrated in this figure, example system 100 may include one or more modules 102 for performing one or more tasks. As will be explained in greater detail below, modules 102 may include a collection module 104 for collecting a set of field reports indicating respective geofencing violations. Modules 102 may also include a grading module 106 for grading a safety measurement, based on an analysis of the respective geofencing violations, for each candidate route in a set of multiple candidate routes generated for travel between a starting point and a destination point. Modules 102 may also include a recommendation module 108 that recommends, from among the set of multiple candidate routes, a recommended route based at least in part on the recommended route being graded as safer than another candidate route.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting users. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
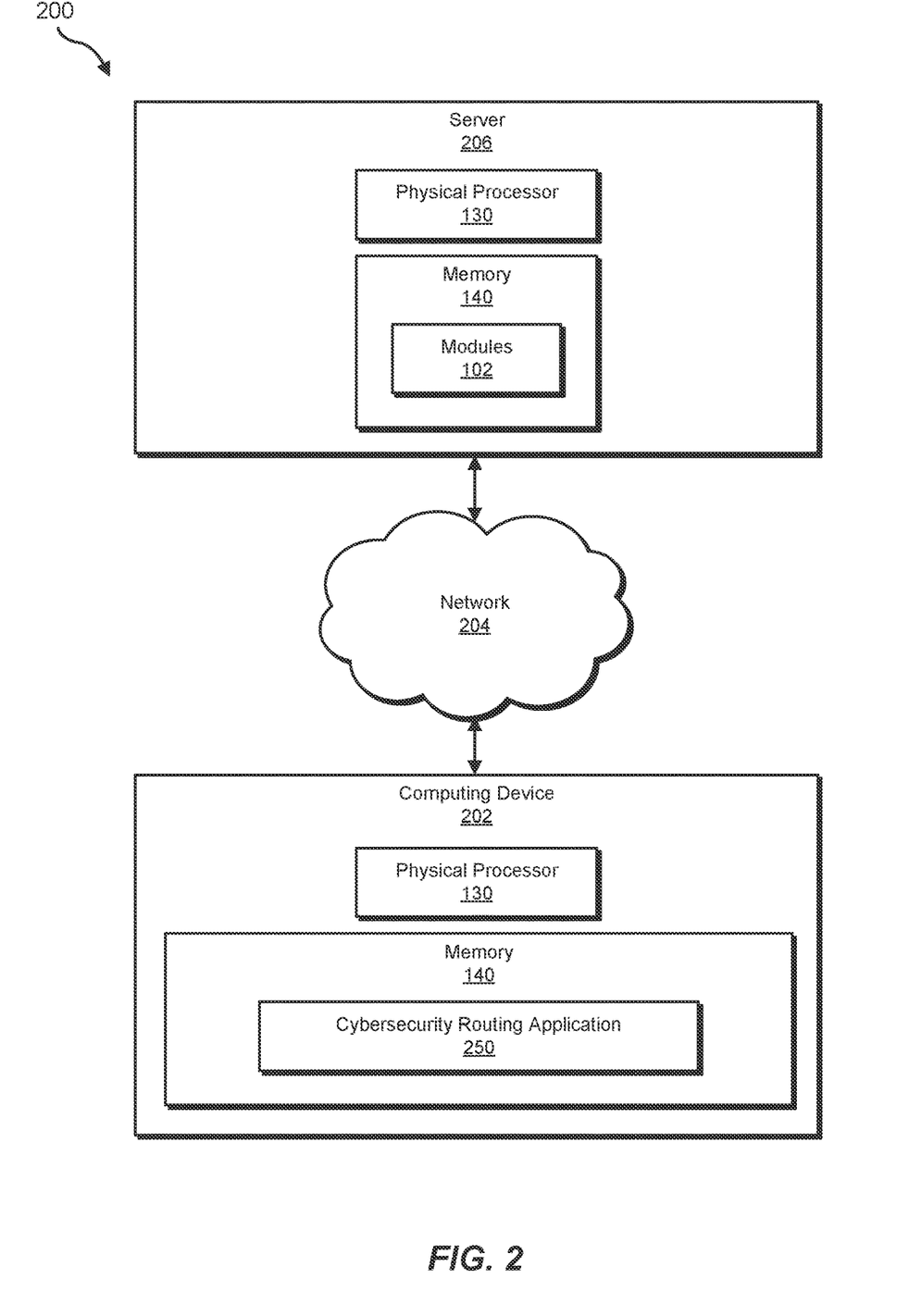
FIG. 2 is a block diagram of an additional example system for protecting users.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect users. As further shown in this figure, computing device 202 may further provide a cybersecurity routing application 250, which may facilitate the performance of method 300, as discussed further below. As used herein, the term "cybersecurity routing application" generally refers to an application that recommends one route over another based on at least a consideration of predicted safety, consistent with method 300.

Computing device 202 generally represents any type or form of computing device capable of reading computer-executable instructions. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
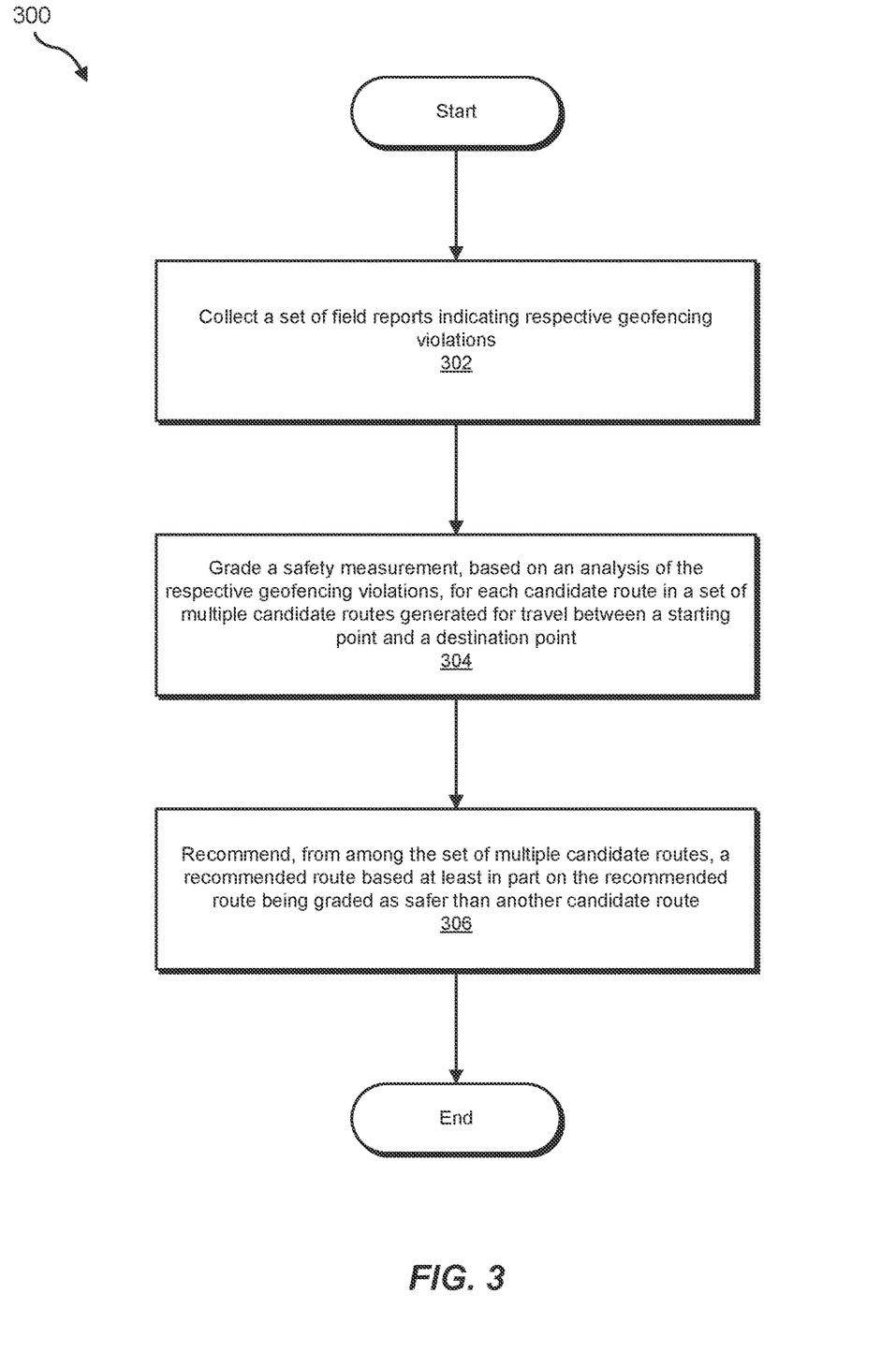
FIG. 3 is a flow diagram of an example method for protecting users.

FIG. 3 is a flow diagram of an example computer-implemented method 300 for protecting users. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may collect the set of field reports indicating respective geofencing violations. For example, at step 302, collection module 104 may collect the set of field reports indicating respective geofencing violations.

As used herein, the term "geofencing" generally refers to a guardian or user establishing a type of perimeter around one or more particular locations or spaces by marking or indicating these locations or spaces within a security application such that when another user enters a portion of the specified locations, a violation is detected or reported. For example, a guardian or parent may establish a geofencing perimeter around a brewery to indicate that a child, ward, or other user should not enter that particular perimeter. In a case that the child actually does enter that particular perimeter, the corresponding cybersecurity application on the child's mobile device may detect the geofencing violation and issue a report such as an email back to the guardian or parent. Moreover, as used herein, the term "field report" generally refers to electronic notifications or network messages transmitted from one user or customer of a cybersecurity application corresponding to method 300.

Figure 4:
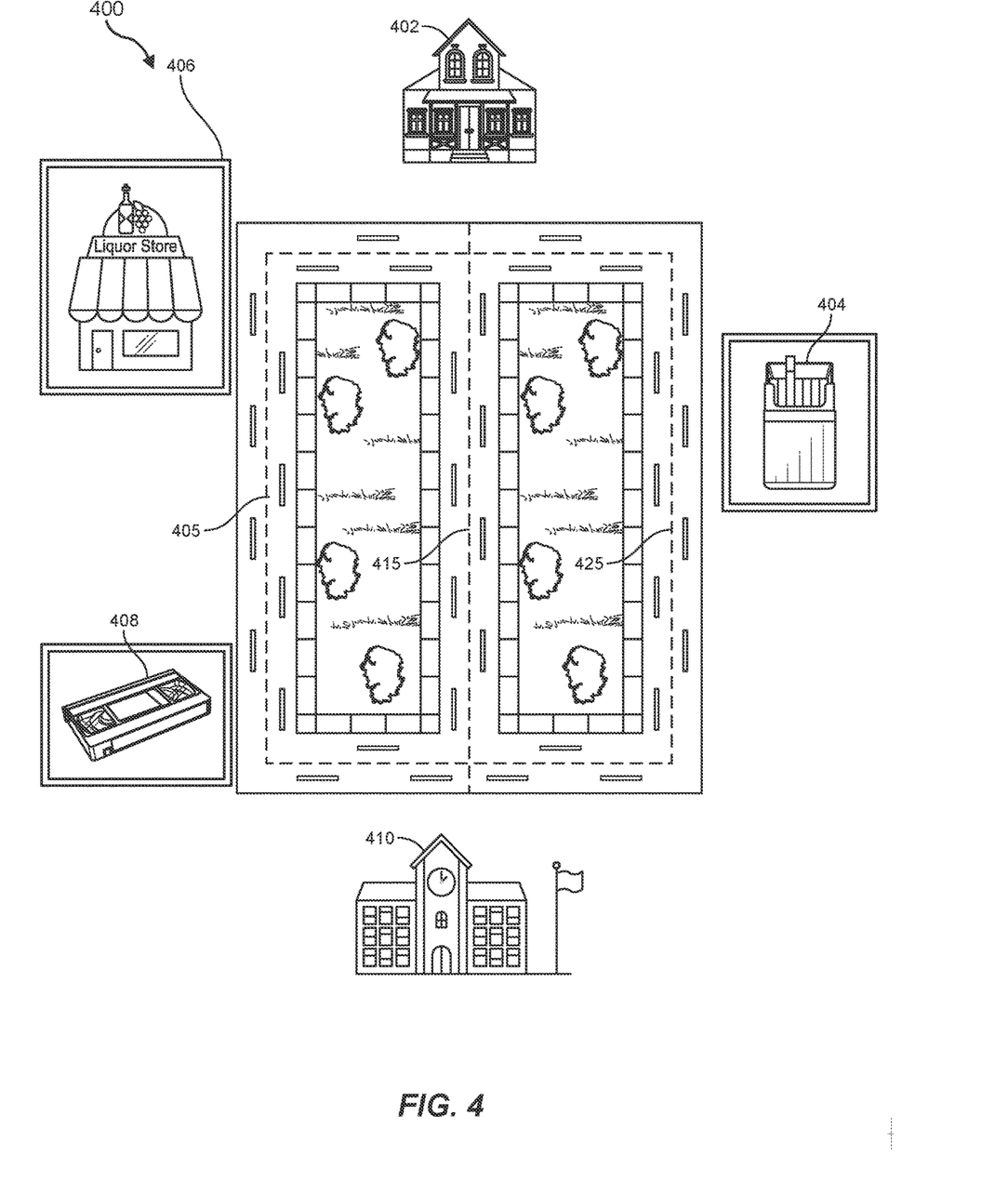
FIGS. 4-6 are diagrams relating to geofencing.

The systems described herein may perform step 302 in a variety of ways. By way of example, FIG. 4 shows an illustrative diagram 400 relating to geofencing in connection with method 300. As further shown in this figure, diagram 400 may include a school 410 adjacent a set of three connected streets. The set of three connected streets effectively form three alternative paths for a child from the school to select from when traveling to a home 402 at the end of the school day. These three separate paths or streets are marked by an indicator 405, an indicator 415, and an indicator 425. Along the various streets, there are three separate locations relevant to geofencing. An icon 408 indicates an adult video store, an icon 406 indicates an alcoholic drink store, and an icon 404 indicates a cigarette store. Accordingly, at the end of the school day the child may attempt to select which one of three separate routes the child will utilize to walk to home 402.

Figure 5:
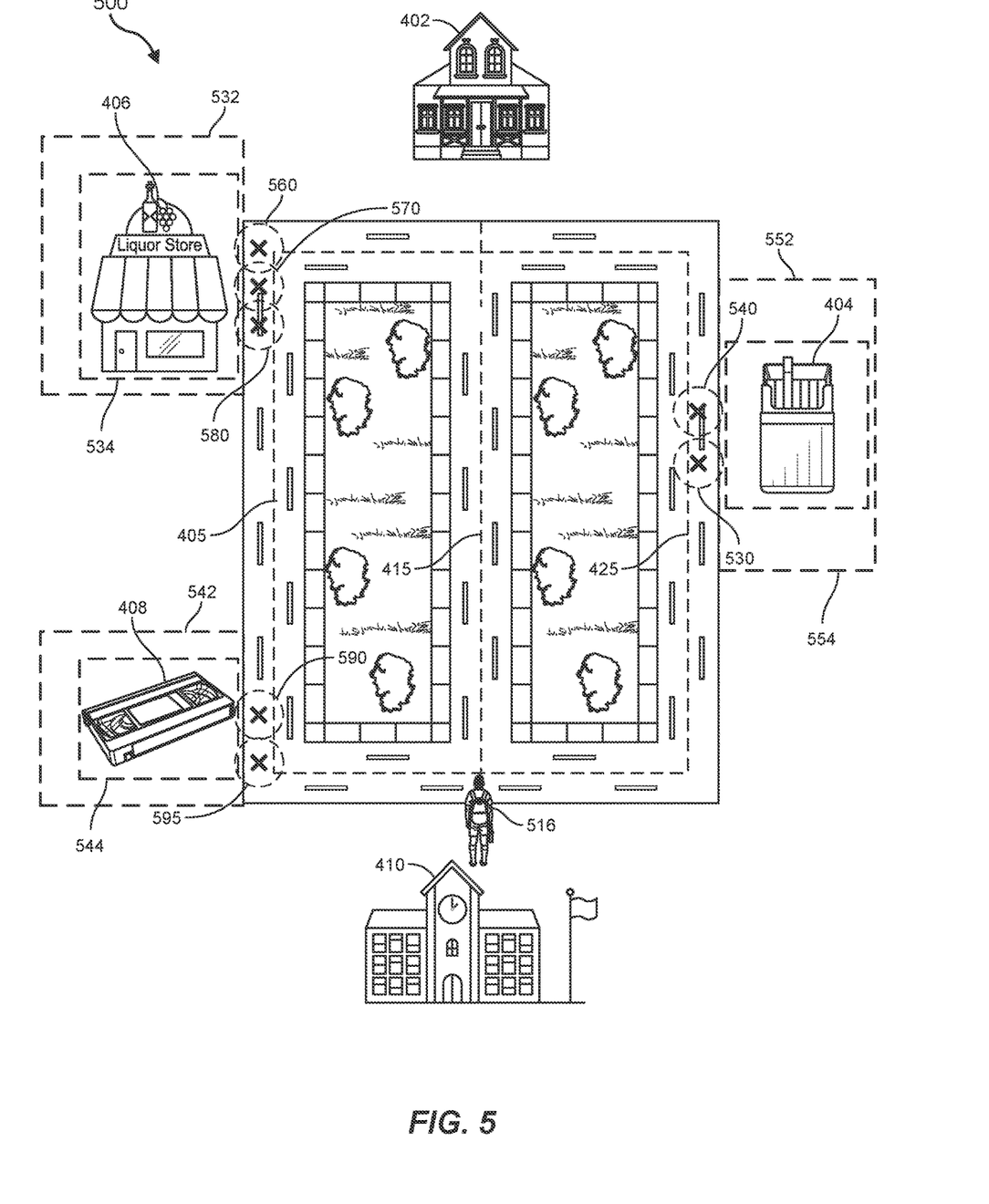

Elaborating on FIG. 4, FIG. 5 shows a diagram 500 in which various customers or parents using a cybersecurity application corresponding to method 300 have established respective geofences around the three avoidable locations outlined above. These geofences include a geofence 532, a geofence 534, a geofence 542, a geofence 544, a geofence 552, and a geofence 554. Moreover, FIG. 5 also further illustrates how a child 516 may be trying to determine which street to use when traveling home after the end of school. For example, the child may have a smart phone with a corresponding cybersecurity or other application that provides routing functionality, and the child may request for the application to choose which of the available routes to use or recommend.

Additionally, FIG. 5 also further illustrates how multiple different instances of geofencing violations have been previously detected and reported (e.g., reported back to a centralized or backend security server, such as server 206). For example, various different children from different families, or corresponding to different customers, may have walked or driven too close to the perimeter, or crossed the perimeter, for one or more corresponding geofences. These instances may have generated geofencing violations corresponding to an indicator 560, an indicator 570, an indicator 580, an indicator 590, an indicator 595, an indicator 540, and an indicator 530.

Collection module 104 may collect the field reports at least in part by logging one or more items of information that are recorded within the field reports. These items of information may include one or more from a set including a date, time, a weather condition, an indication of whether a user was walking or driving, an indication of whether a user was a driver or passenger, and/or an indication of whether a user was alone or not alone. The field reports may also optionally include personally identifiable information such as a name, customer number, Social Security number, address, phone number, credit card number, etc. Nevertheless, to protect the privacy of the user, a corresponding application at a smartphone of child 516 and/or server 206 may strip out or anonymize one or more of these instances of personally identifiable information. In these cases, the anonymized field reports may nevertheless still contain information from the set listed above (e.g., date, time, weather condition, etc.) while nevertheless having removed information that might uniquely identify a particular user or otherwise compromise the user's privacy. Moreover, to further protect the user's privacy the field reports and corresponding information may be locked within a vault of the backend security server (e.g., a backend security server for a cybersecurity vendor such as NortonLifeLock).

Returning to FIG. 3, at step 304, one or more of the systems described herein may grade a safety measurement, based on an analysis of the respective geofencing violations, for each candidate route in a set of multiple candidate routes generated for travel between a starting point and a destination point. For example, at step 304, grading module 106 may grade a safety measurement, based on an analysis of the respective geofencing violations, for each candidate route in a set of multiple candidate routes generated for travel between a starting point and a destination point.

As used herein, the term "safety measurement" generally refers to any suitable measurement of how safe one route may be for a user. For example, a safety measurement may refer to a safety score along a spectrum, such as a spectrum from zero to 100. Alternatively, a safety measurement may refer to a grade along a scale from A+ (most safe) to F– (least safe), and so forth.

Step 304 may be performed in a variety of ways. In some examples grading the safety measurement for each candidate route is performed in response to a request for an application to recommend a safe route. Moreover, in further examples, each candidate route is generated in response to a request for the application to recommend the safe route. Thus, returning to the example of FIG. 5, child 516 may indicate a request or command on a corresponding cybersecurity application executing on a smart phone to recommend a particular route from school 410 to home 402. In response, the cybersecurity routing application may generate three separate routes corresponding to indicator 405, indicator 415, and indicator 425.

Furthermore, at step 304, grading module 106 may grade each of these respective routes based on an analysis of the geofencing violations shown in FIG. 5. For example, grading module 106 may determine that the route corresponding to indicator 405 is adjacent the geofencing violations corresponding to indicator 560, indicator 570, and indicator 580, as well as indicator 590 and indicator 595. Similarly, grading module 106 may determine that the route corresponding to indicator 425 is adjacent geofencing violations corresponding to indicator 540 and 530. In contrast, grading module 106 may further determine that the route corresponding to indicator 415 is not adjacent to any detected geofencing violation. Accordingly, grading module 106 may, in this simplified example, grade the route corresponding to indicator 405 more poorly (e.g., worst), grade the route corresponding to indicator 425 poorly as well (e.g., worse), and grade the route corresponding to indicator 415 more highly (e.g., safest). Thus, in this example, grading module 106 basically counts the number of geofencing violations that are adjacent to or sufficiently close to a particular route as indicated by a proximity measurement.

Figure 6:
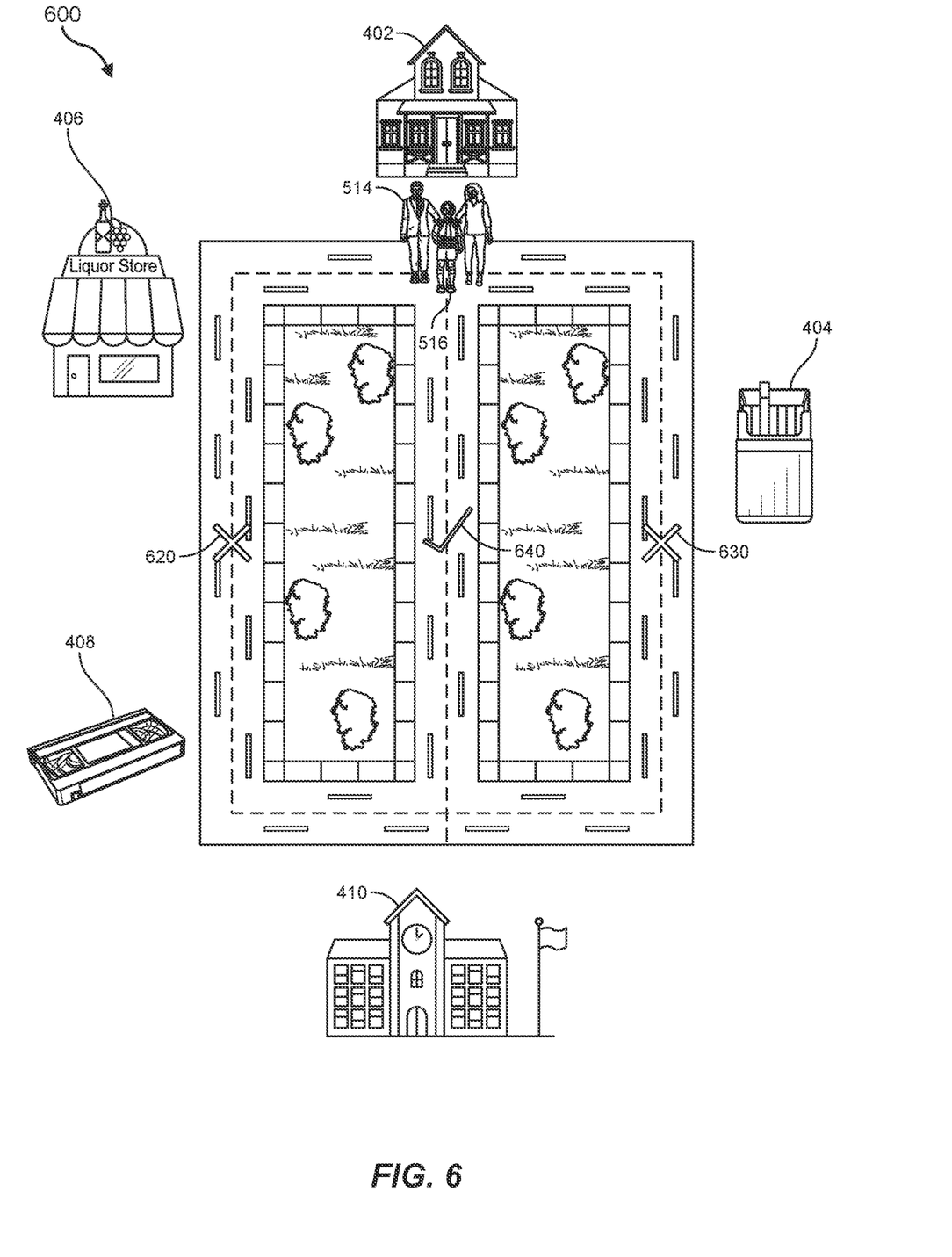

In some examples, geofencing prevents a user from being exposed to an entity that is dangerous to the user due to a vulnerability that is specific to the user. As used herein, the term "vulnerability that is specific to the user" generally refers to a specific vulnerability that only a subset of the human population shares. For example, all human beings are vulnerable to high-speed traffic accidents or falling off of tall buildings. On the other hand, only some human beings are lactose intolerant and therefore vulnerable to milk products. Similarly, children as a subset of the human population have a number of vulnerabilities that are unique to children and not shared with the general adult population. The example of FIGS. 4-6 shows how children might be uniquely or specifically vulnerable to risks associated with adult videos, alcoholic beverages, or cigarettes.

On the other hand, even some adults may have vulnerabilities that make them uniquely different from other adults who do not have these vulnerabilities. For example, certain adults might have an addiction problem, in which case the adults might be addicted to alcohol or to cigarettes. Accordingly, the technology of this application may help to further protect adults who have a problem with addiction or other specific vulnerability that is not shared by the general adult population, as further discussed above.

In some examples, the method may further include filtering a subset of field reports from the set of field reports based on a determination that the subset of field reports does not sufficiently match a current condition for traveling from the starting point to the destination point. One general inventive concept is to find a safest route based on a number of geofencing violations, but nevertheless it can be helpful for grading module 106 to filter geofencing violations based on one or more attributes, such as walking/driving, driver/passenger, alone/accompanied, date, time, under, age, weather condition, etc. For example, if a subset of geofencing violations happened during a child's walking to school, but none when the child was driving, then grading module 106 may determine that it is acceptable to route the child along a corresponding route so long as the child is driving rather than walking.

In other words, grading module 106 may filter out geofencing violations by matching under which conditions the field reports happened with the current condition in which the user or child is situated. If the child happens to be walking, then grading module 106 may filter out geofencing violations that do not involve walking, and so on. In this manner, grading module 106 may seek to generate a set of geofencing violations, by filtering out nonapplicable geofencing violations, such that a remaining set of geofencing violations are sufficiently similar to the situation or circumstances in which the user is currently presented, according to a similarity measurement.

In some examples, the field reports achieve crowdsourcing such that a user of a cybersecurity application benefits from other users issuing the field reports of geofencing violations. Returning to the example of FIG. 5, some or all of the geofencing violations corresponding to indicator 560, indicator 570, indicator 580, indicator 590, indicator 595, indicator 540, and indicator 530 may have been submitted from smartphones for children other than child 516. In these cases, the various children or customers may be completely independent from each other. Nevertheless, because the smartphones or mobile devices of these children contain effectively the same cybersecurity routing application, consistent with method 300, these smartphones may automatically report geofencing violations to a centralized backend server, such as server 206. In this way, child 516 may benefit from the geofencing violation reporting of completely different and independent customers, even if child 516 has never caused a geofencing violation himself or herself.

Returning to FIG. 3, at step 306, one or more of the systems described herein may recommend, from among the set of multiple candidate routes, a recommended route based at least in part on the recommended route being graded as safer than another candidate route. For example, at step 306, recommendation module 108 may recommend, from among the set of multiple candidate routes, a recommended route based at least in part on the recommended route being graded as safer than another candidate route.

FIG. 6 shows another diagram 600 that elaborates on diagram 400 and diagram 500. In this example, recommendation module 108 has successfully recommended a specific route, corresponding to indicator 640, consistent with the discussion above of step 304. Similarly, recommendation module 108 has also recommended against the route corresponding to an indicator 620 and the route corresponding to indicator 630. In this way, the cybersecurity routing application has successfully navigated the child across the route corresponding to indicator 640 from school 410 to home 402 at which point child 516 is reunited with parents 514. By selecting the route corresponding to indicator 640, the cybersecurity routing application has successfully navigated the child in a manner that avoids the dangers or risks associated with adult videos, alcoholic beverages, or cigarettes, etc. Moreover, in other examples, method 300 may be used to successfully navigate adults with specific vulnerabilities, such as addiction vulnerabilities, around corresponding risks or dangers, as further discussed above.

Figure 7:
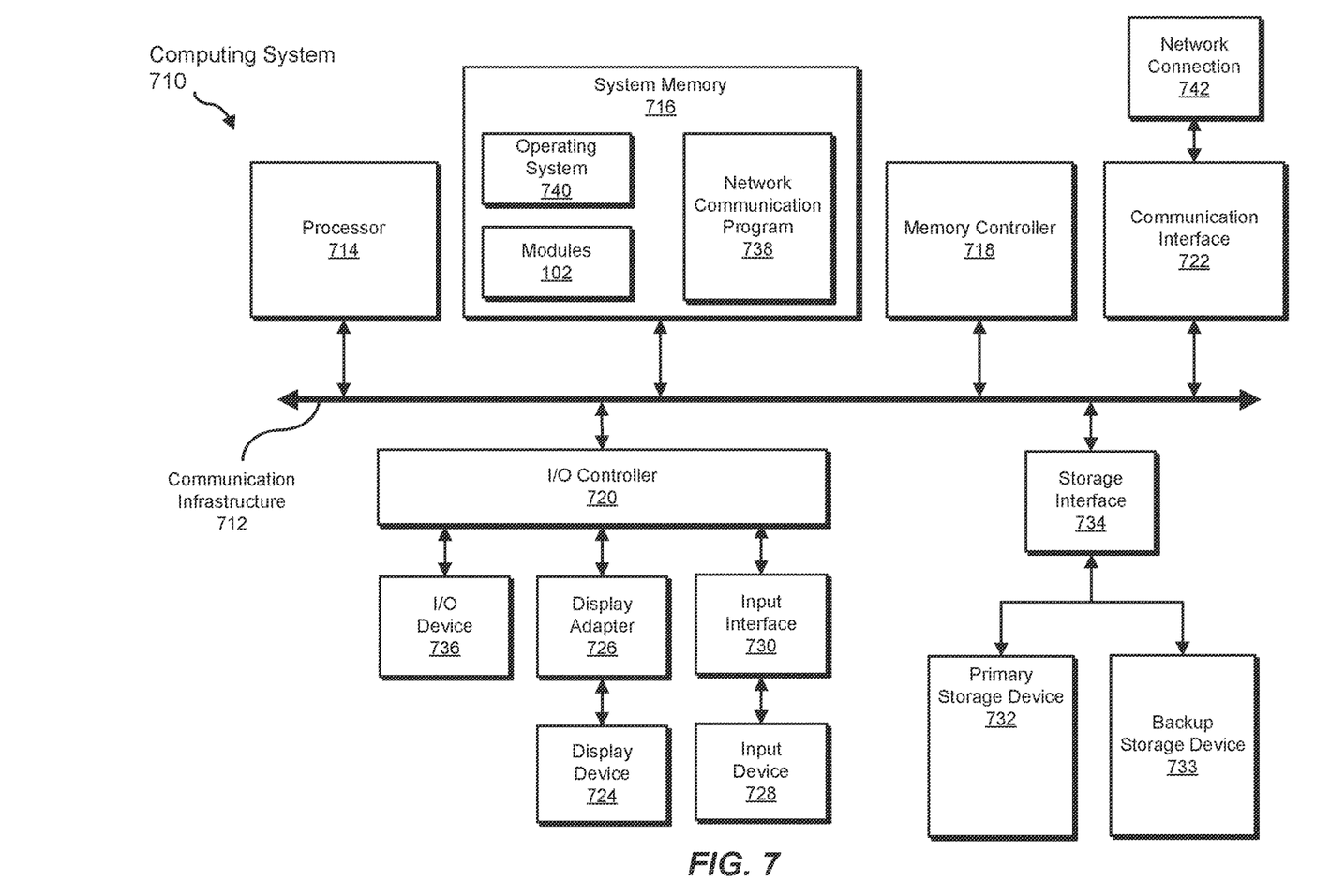
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
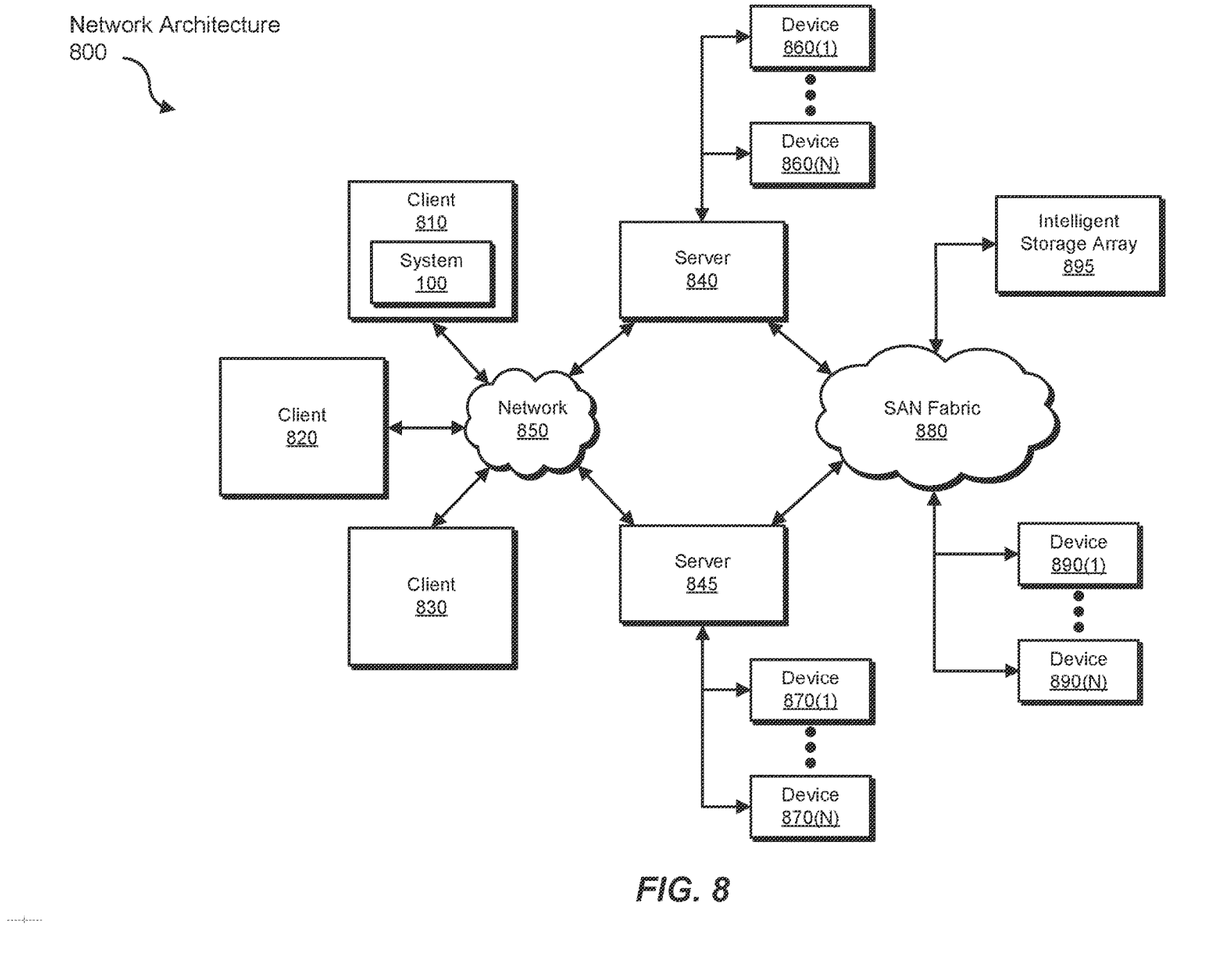
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for protecting users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting users, at least a portion of the method being performed by a computing device comprising at least one processor, the method comprising:
    collecting a set of field reports indicating respective geofencing violations;
    grading a safety measurement, based on an analysis of the respective geofencing violations, for each candidate route in a set of multiple candidate routes generated for travel between a starting point and a destination point; and
    recommending, from among the set of multiple candidate routes, a recommended route based at least in part on the recommended route being graded as safer than another candidate route.

2. The computer-implemented method of claim 1, wherein each field report in the set of field reports indicates at least two of:
    date and time;
    a weather condition; or
    whether a user was walking or driving.

3. The computer-implemented method of claim 1, wherein each field report in the set of field reports indicates at least one of:
    whether a user was a driver or a passenger; or
    whether the user was alone or not alone.

4. The computer-implemented method of claim 1, further comprising filtering a subset of field reports from the set of field reports based on a determination that the subset of field reports does not sufficiently match a current condition for traveling from the starting point to the destination point.

5. The computer-implemented method of claim 1, further comprising at least partially anonymizing data in the field reports to protect user privacy.

6. The computer-implemented method of claim 1, wherein the field reports are locked within a vault of a backend security server for a cybersecurity vendor.

7. The computer-implemented method of claim 1, wherein the field reports achieve crowdsourcing such that a user of a cybersecurity application benefits from other users issuing the field reports of geofencing violations.

8. The computer-implemented method of claim 1, wherein grading the safety measurement for each candidate route is performed in response to a request for an application to recommend a safe route.

9. The computer-implemented method of claim 8, wherein each candidate route is generated in response to the request for the application to recommend the safe route.

10. The computer-implemented method of claim 1, wherein geofencing prevents a user from being exposed to an entity that is dangerous to the user due to a vulnerability that is specific to the user.

11. A system comprising:
    at least one physical processor;
    physical memory comprising computer-executable instructions that, when executed by the physical processor, cause the physical processor to perform a method comprising:
        collecting a set of field reports indicating respective geofencing violations;
        grading a safety measurement, based on an analysis of the respective geofencing violations, for each candidate route in a set of multiple candidate routes generated for travel between a starting point and a destination point; and
        recommending, from among the set of multiple candidate routes, a recommended route based at least in part on the recommended route being graded as safer than another candidate route.

12. The system of claim 11, wherein each field report in the set of field reports indicates at least two of:
    date and time;
    a weather condition; or
    whether a user was walking or driving.

13. The system of claim 11, wherein each field report in the set of field reports indicates at least one of:
    whether a user was a driver or a passenger; or
    whether the user was alone or not alone.

14. The system of claim 11, wherein the grading module is further configured to filter a subset of field reports from the set of field reports based on a determination that the subset of field reports does not sufficiently match a current condition for traveling from the starting point to the destination point.

15. The system of claim 11, wherein the grading module is further configured to at least partially anonymize data in the field reports to protect user privacy.

16. The system of claim 11, wherein the grading module is further configured to lock the field reports within a vault of a backend security server for a cybersecurity vendor.

17. The system of claim 11, wherein the system is configured such that the field reports achieve crowdsourcing and a user of a cybersecurity application benefits from other users issuing the field reports of geofencing violations.

18. The system of claim 11, wherein the grading module is configured to grade the safety measurement for each candidate route in response to a request for an application to recommend a safe route.

19. The system of claim 18, wherein the grading module is configured to generate each candidate route in response to the request for the application to recommend the safe route.

20. A non-transitory computer-readable medium comprising one or more computer-executable instructions that, when executed by at least one processor of a computing device, cause the computing device to perform a method comprising:
- collecting a set of field reports indicating respective geofencing violations;
- grading a safety measurement, based on an analysis of the respective geofencing violations, for each candidate route in a set of multiple candidate routes generated for travel between a starting point and a destination point; and
- recommending, from among the set of multiple candidate routes, a recommended route based at least in part on the recommended route being graded as safer than another candidate route.

* * * * *